United States Patent [19]

Zuk

[11] Patent Number: 4,882,749
[45] Date of Patent: Nov. 21, 1989

[54] CONTROL OF SIGNAL TRANSMISSION
[75] Inventor: Borys Zuk, New Brunswick, N.J.
[73] Assignee: Harris Semiconductor (Patents) Inc., Melbourne, Fla.
[21] Appl. No.: 817,489
[22] Filed: Jan. 9, 1986
[51] Int. Cl.$^4$ .............................................. H04B 3/36
[52] U.S. Cl. .................................... 379/346; 379/347; 379/338
[58] Field of Search ................ 379/338, 340, 341, 342, 379/346, 347, 345, 348, 414; 381/94, 42, 46, 56, 57, 47; 370/13.1, 4; 375/4; 178/70 R, 71 N; 328/138, 149, 167, 164; 340/425

[56] References Cited

U.S. PATENT DOCUMENTS

| | | | |
|---|---|---|---|
| 1,968,460 | 7/1934 | Llewellyn | 381/94 |
| 2,170,941 | 8/1939 | Davis | 379/347 |
| 2,206,146 | 7/1940 | Wright | 379/408 |
| 2,607,860 | 8/1952 | Skillman | 333/28 R |
| 3,483,336 | 12/1969 | Lent | 379/338 |
| 3,651,265 | 3/1972 | Van Der Houwen | 178/70 R |
| 3,784,749 | 1/1974 | Shigeyama et al. | 381/94 |
| 3,803,357 | 4/1974 | Sacks | 381/94 |
| 3,873,775 | 3/1975 | Chown | 375/4 X |
| 3,879,583 | 4/1975 | Rooks | 379/342 |
| 4,135,590 | 1/1979 | Gaulder | 381/94 |
| 4,143,325 | 3/1979 | Kahn | 325/478 |
| 4,352,962 | 10/1982 | LaMothe | 379/343 |
| 4,358,738 | 11/1982 | Kahn | 328/165 |
| 4,475,209 | 10/1984 | Udren | 340/425 X |
| 4,609,878 | 9/1986 | Rodgers | 330/136 |

OTHER PUBLICATIONS

"Design of an Integrated Circuit for the TIC Low--Power Line Repeater", by Paul C. Davis et al., IEEE Journal of Solid-State Circuits, vol. SC-14, No. 1, Feb. 1979.

Primary Examiner—Jin F. Ng
Assistant Examiner—Randall S. Vaas
Attorney, Agent, or Firm—H. I. Schanzer; W. J. Shanley

[57] ABSTRACT

Circuits embodying the invention include apparatus for sensing the amplitude and the frequency of the signals received from one section of a telephone cable and for propagating onto the succeeding section of telephone cable only those received signals having an amplitude greater than a predetermined level and whose frequency is within the predetermined range.

4 Claims, 3 Drawing Sheets

CONTROL OF SIGNAL TRANSMISSION

This invention relates to circuitry for controlling the transmission of signals along telephone lines and in particular, to the transmission of pulse coded modulated (PCM) signals.

As data signals propagate along a telephone line or cable, they undergo significant distortion. To maintain the integrity (shape, amplitude and frequency) of the data signals being propagated along telephone lines, "repeaters" are located, approximately every 6000 feet, along the telephone lines. The repeaters function to: (a) sense the presence of signals received from one section of cable; (b) determine whether the received signals are "data" or "noise"; and (c) reshape and regenerate the data signals for retransmission to the next cable section while inhibiting the transmission of the "noise" signals.

Known prior art circuits use various amplitude discrimination schemes (e.g. peak detectors) to sense the amplitude of the signals on the line. If the signal amplitude is below a predetermined level, the line signal is assumed to be noise and it is then suppressed. If the signal amplitude is above the predetermined level, it is assumed to be a valid signal and is regenerated for retransmission. However, the known prior art schemes are deficient in a noisy environment where the amplitude of the noise signals is greater than the predetermined level. The high amplitude noise signals are then taken as data signals and propagated along the line.

This problem is overcome in circuits embodying the invention by examining the frequency and the amplitude of the line signals.

Circuits embodying the invention include means for sensing the amplitude and the frequency of the signals received from one section of telephone cable and for propagating onto the next section of telephone cable only those received signals having an amplitude greater than a preset level and whose frequency is within a predetermined range.

In the accompanying drawing, like reference characters denote like components; and FIG. 1 is a simplified block diagram of a "repeater" circuit embodying the invention;

Figure 1:
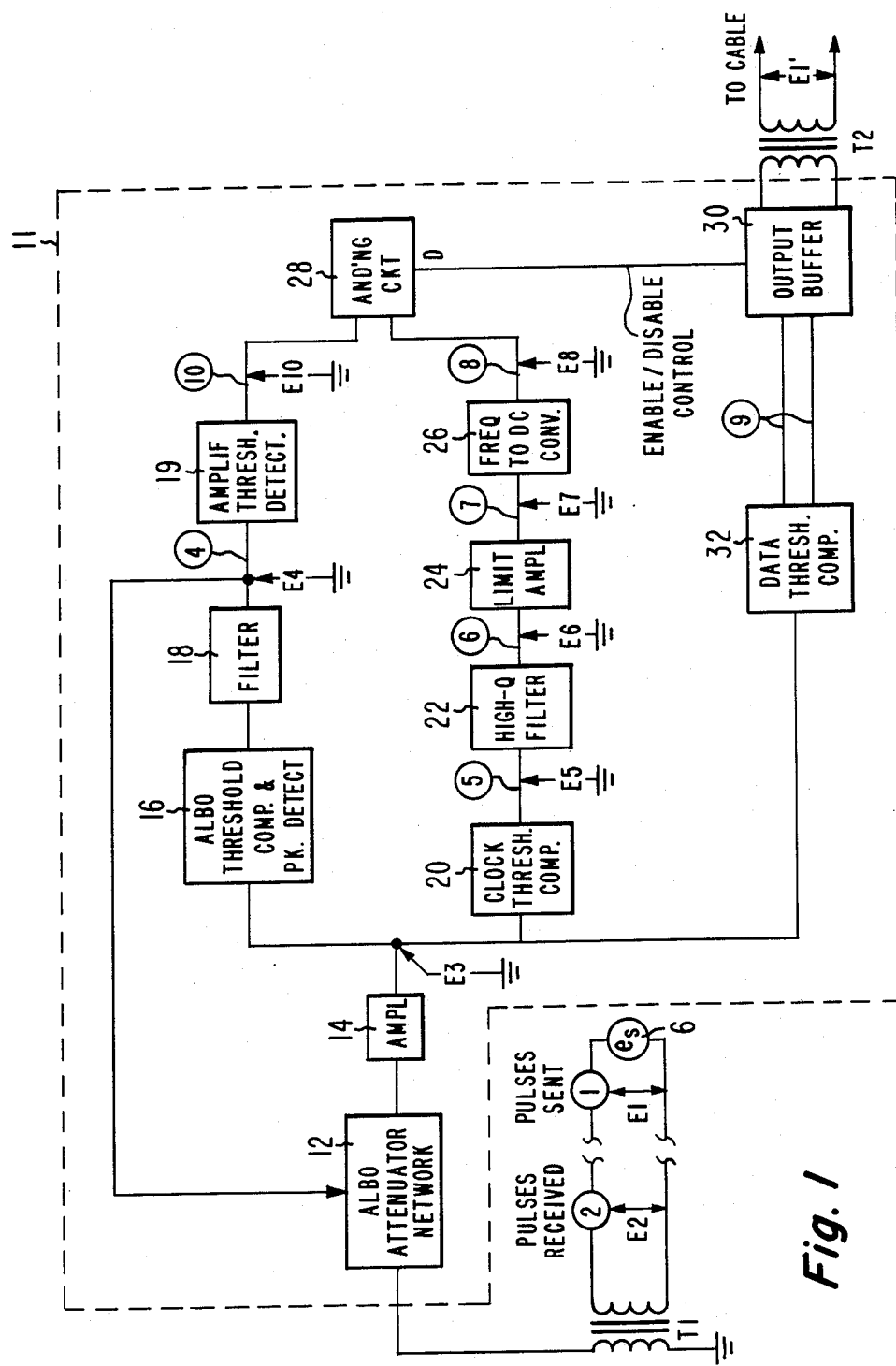

The invention will now be explained with reference to FIGS. 1 and 2. As shown in FIG. 1, a source 6 of data signals, E1, is connected to one end of a telephone line 81 at a first node 1. The source 6 may be an original signal generating source or may represent a "repeater" whose output is coupled to the next section 81 of telephone cable. Typically, the signals E1, produced at node 1, may be assumed to have a fixed amplitude (e.g. +3 volts or −3 volts) and to have a fixed repetition rate (e.g. 1.544 MHz) as shown for waveform E1 of FIG. 2. The signals E1 are propagated along the length of the telephone line section 81, which may be, for example, approximately 6000 feet long, to the next repeater, 11, down the line. As the E1 signals are propagated along the line they undergo significant distortion and may be shifted about the zero volt reference line. In fact, the signals received at the end of the line section 81 (i.e. at terminal 2) may be, for example, as shown in waveform E2 of FIG. 2. Note that the amplitude and shape of the E1 signal is considerably altered.

The signals E2 received at terminal 2 are coupled via a transformer T1 into repeater 11. Repeater 11 functions to reshape and regenerate the received data signals such that, although distorted signals such as those shown in waveform E2 of FIG. 2 are applied to the input of the repeater, the repeater produces at its output, pulses, such as those shown as E1' in FIG. 2, having similar characteristics (amplitude and frequency) to the original input signals E1. As detailed below, the repeater also functions to inhibit, or prevent, the production of signals at its output if the signal E2 at the input to repeater 11 is a "random noise" signal; this may occur, for example, when there is a break in the telephone line.

The secondary of transformer T1 is connected to the input of an Automatic Line Build Out (ALBO) attenuator network 12 whose output is connected to the input of an amplifying network 14. The attenuating and amplifying networks 12 and 14 include means for reshaping and restoring the attenuated and dispersed E2 signals received at the input to the repeater. In response to the E2 signals, the networks 12 and 14 function to produce, at output node 3 of amplifying network 14, constant amplitude signals E3 having characteristics of the type shown for waveform E3 of FIG. 2.

Amplifying network 14 thus functions to restore the symmetry of the signals about a reference voltage (e.g. of 2.5 volts) and to amplify the signal. The signal E3 produced at node 3 has the same frequency distribution as the input signal (E1 and E2) and its amplitude is determined by networks 12 and 14.

The signals produced at node 3 are then fed along three different paths for further processing as described below. The first path consists of an ALBO threshold comparator and peak detector 16, a filter 18, and an amplitude threshold detector 19, which function to determine whether the amplitude of the input signal is above a predetermined level. The second path consists of a clock threshold comparator 20, a high-Q filter 22, a limit amplifier network 24, and a frequency to DC level converter network 26, which function to determine whether the frequency of the input signal is within an allowable frequency range. The outputs of the first and second paths are coupled to an "AND'ing" network 28 to produce an enabling or disabling signal which controls an output buffer 30. The third path consists of a data threshold comparator network 32 for reshaping the input signal and applying it to the output buffer 30. If the buffer is enabled, the reshaped signals is transmitted via a transformer T2 to the next cable section. If the buffer is disabled, no signals are transmitted.

Circuits for performing the functions of blocks 12, 14, 16, 18, 20, 22, 24 and 32 are known. By way of example, a system including similar functional blocks to those listed above is shown in an article entitled "Design of an Integrated Circuit for The T1C Low-Power Line Repeater" by Paul C. Davis et al. published in the *IEEE Journal of Solid-State Circuits*, Vol SC-14, No. 1, February 1979, at pages 109 to 120. Accordingly, The circuitry forming blocks 12, 14, 16, 18, 20, 22, 24 and 32 need not be greatly detailed and any suitable circuit for performing the function called for in the listed blocks may be used. However, to better understand the detailed description of the invention to follow, a brief description of the operation and function of the blocks forming the system folflows.

The signal E3 produced at node 3 is applied to network 16 which senses and detects the peak amplitude of the E3 signals. The output of network 16 is connected to filter 18 for producing, at output node 4 of filter 18, a DC level E4 which is used as a feedback signal to control the amount of attenuation in ALBO attenuator network 12 so as to maintain a relative constant amplitude signal of E3. E4 is related to E3 as follows: E4 is at or close to zero volts for values of E3 less than the predetermined ALBO threshold level. When the level of E3 exceeds the predetermined ALBO threshold level, then E4 rises rapidly and proportionately to the minutes changes in E3.

The signal E4 is also applied to an amplitude threshold detector 19 to determine whether the amplitude of E4 is above or below a predetermined level. If the amplitude of E4 is below the preset level, the input signal is assumed to be noise and the signal E10 produced at the output, node 10, of detector 19 is used to indicate that the input signal E2 is not valid. If the amplitude of E4 is above the preset level, the E10 signal is used to indicate that the amplitude of the input signal is valid.

Figure 2:
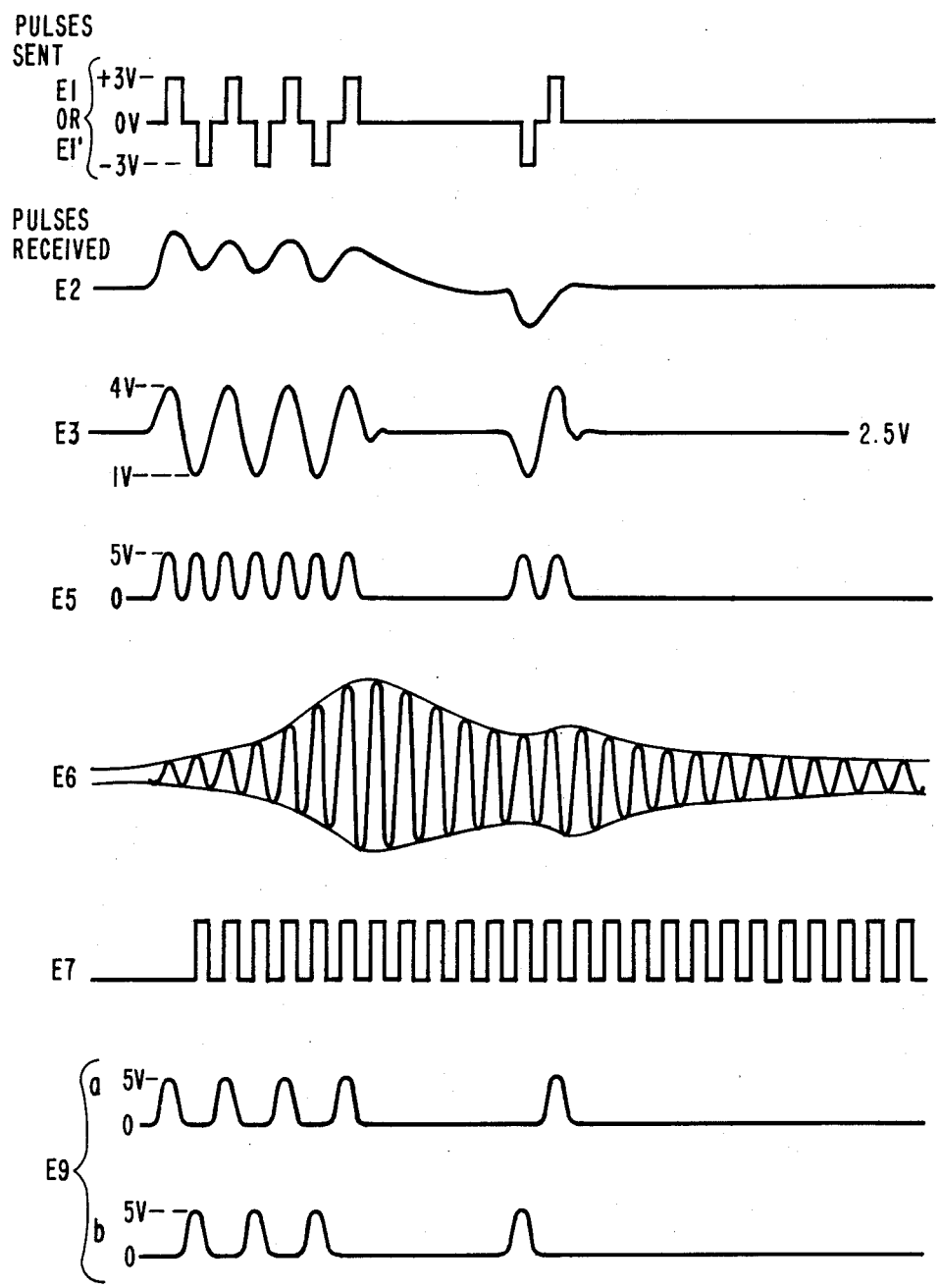
FIG. 2 is a waveform diagram of signals present at various points of the circuit of FIG. 1.

The signals, E3, are also applied to a clock threshold comparator network 20, which functions to clip and add the positive and negative portions of the E3 signals to produce an output waveform E5 at node 5 having twice the frequency of signals (E1, E2 or E3) as shown, for example, in waveform E5 of FIG. 2. The output E5 of clock comparator 20 is applied to a high-Q tuned tank filter 22 whose Q is, for example, 100 (or more), for producing oscillations at node 6, with an envelope of the type shown in waveform E6 of FIG. 2. The shape of the envelope waveform and the amplitude of the signals within the envelope at any point in time is a function of the number of input pulses applied to the tuned tank and their frequency. The high-Q network 22 functions as a narrow band pass filter. Signals applied to network 22 having frequencies (or harmonics) other than the resonant frequency of network 24 are substantially attenuated. In brief, only signals applied to the high-Q network 22 which have a minimum energy level at, or close to, the resonant frequency, or at an harmonic thereof will cause oscillations or ringing of the network as shown for waveform E6 in FIG. 2. If, for example, the signals applied to the input of the high-Q network 22 do not have a frequency component at, or close to, the resonant frequency, they will be filtered out, and the output of the high-Q network will be a low amplitude noise signals. The output of the high-Q network 22 is applied to a limit amplifier 24 whose output E7, in response to an input E6, may be as shown in waveform E7 of FIG. 2.

In circuits embodying the invention, the output E7 of the limit amplifier is applied to a frequency to DC level converter network 26 which functions to produce a DC level, E8, at its output, node 8, when signals E3, E5 and E6 have the "correct" frequency. Signal E8 produced at node 8, and the signal E10 produced at the output of threshold detector 19 are applied to the inputs of "AND'ing" network 28. When the signals E10 and E8 are both present and have a predetermined amplitude, the "AND'ing" circuit 28 produces an output, D, which enables output buffer 30. If the amplitude of either one or both of E10 or E8 is below the predetermiend level, the output of the "AND'ing" circuit 28 functions to disable buffer circuit 30.

The E3 signal which may be defined as the data signal is applied to data threshold comparator 32 at whose output, node 9, are produced pulses E9 having the characteristics shown in waveforms E9a and E9b of FIG. 2. The signals E9 are applied to output buffer circuit 30. When buffer 30 is enabled, the signals E9 are recombined and amplified and coupled to the primary of a transformer T2 whose secondary is connected to the telephone cable onto which is propagated data signals E1' which have the same, or similar characteristics as original signals E1.

Figure 3:
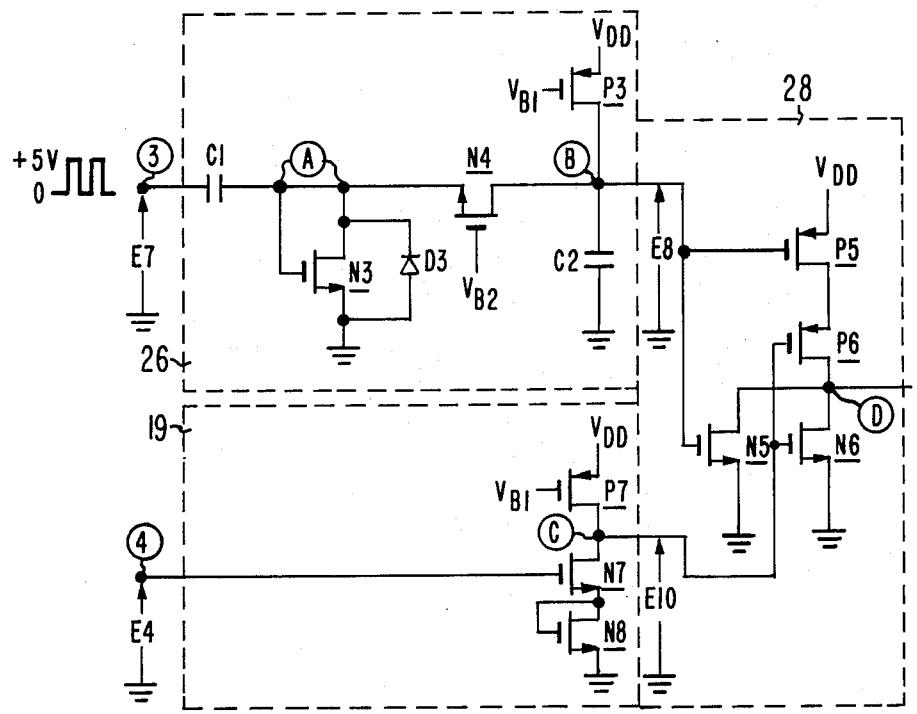
FIG. 3 is a schematic diagram of a portion of the circuitry embodying the invention.

For a better understanding of the instant invention, circuits for performing the amplitude threshold detection 19, the frequency to DC level conversion 26, and the "AND'ing" function are detailed in FIG. 3.

The frequency to DC level converter network 26 of FIG. 3 includes an input terminal 7 to which is applied the AC signal (E7) produced at the output of circuit 24. The AC signal present at node 7 is AC coupled via a capacitor C1 to a node A. The drain and gate electrodes of an insulated-gate field-effect transistor (IGFET) N3, of N-conductivity type, are connected to node A and the source electrode of N3 is returned to ground potential. IGFET N3 functions as a diode, which limits the positive potential that can be developed at node A to a value of one threshold voltage ($V_{TH}$) above ground potential; where $V_{TH}$ is the threshold voltage of N3. However, N3 does not limit the value of the negative voltage that can be developed at node A. An IGFET N4, of N-conductivity type, has its drain-to-source conduction path connected between node A and a node B which defines the output of converter 26 and at which an output signal E8 is produced. A bias voltage VB2 is applied to the gate electrode of transistor N4, where VB2 is, for example, 1.6 volts. A capacitor C2 is connected between node B and ground potential. A current sourcing IGFET P3, of P-conductivity type, has its source-to-drain conduction path connected between $V_{DD}$ potential and node B. A bias voltage VB1 is applied to the gate electrode of P3 to cause it to be normally conducting. In the circuit of FIG. 3, P3 is a small, high impedance, device designed to supply a current of approximately 2 microamps into node B when $V_{DD}$ is at 5 volts. Node B is connected to one input of a 2-input NAND gate which forms "AND'ing" circuit 28 and is comprised of transistors P5, N5 and P6, N6.

Figure 4:
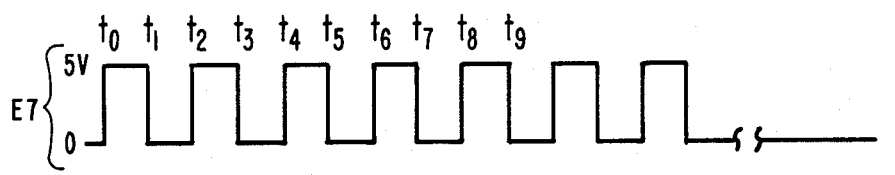
FIG. 4 is a diagram of waveforms at various points of the circuit of FIG. 3.
Figure 4:
Figure 4:
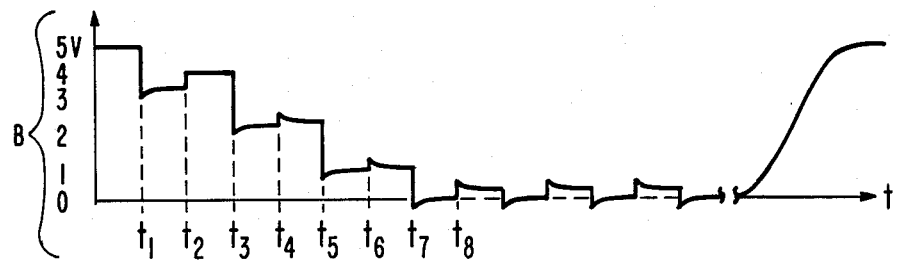

The operation of the frequency to DC converter 26 is best explained by first assuming, for purpose of illustration, that the frequency responsive signal applied to terminal 7 is a square wave. Recall that when the E2 signal applied to the repeater input has the correct frequency, it causes a pulse signal E7 to be produced at node 7. Assume, for example, that the amplitude of the pulse signals is 5 volts, going from 0 volts to +5 volts. As shown in the waveform diagram of FIG. 4, when the E7 signal goes positive at time $t_0$, the signal at node A rises to a value of $V_{TH}$ where $V_{TH}$ is the threshold voltage of transistor N3. Assume in the discussion to follow that the $V_{TH}$ of the transistors is equal to 1 volt. Thus, when the E7 signal goes from 0 to +5 volts, node A is clamped to approximately 1 volt. At time $t_1$ when the input signal goes from +5 volts to 0 volts, a negative going transition of 5 volts is coupled via capacitor C1 to node A. This negative transition tends to cause the potential at node A to go from $+V_{TH}$ to $[+V_{TH}-5]$ volts. Where $V_{TH}$ is assumed to be equal to 1 volt, $V_A$ tends to go negative to a minus four volt level. However, in practice, a diode D3 is connected, or formed, between the source and drain of N3 to limit the negative going potential at node A to a $V_{TN}$ below ground. When the voltage at node A is more negative than [$V_{B2} - V_{TH}$], transistor N4 is turned-on and discharges capacitor C2 into node A, tending to pull the voltage at node B equal to that at node A. For VB2 equal to 1.6 volts and $V_{TH}$ equal to 1 volt, transistor N4 is turned on as soon as the potential at node A goes below 0.6 volt. Thus, when the frequency responsive signal E7 is present at node 7 and is of sufficient amplitude to cause node A to go below 0.6 volts, N4 is turned-on discharging capacitor C2 and pulling node B to, or close to, ground potential. For C1 equal to 0.35 picofarads and C2 equal to 1 picofarad it takes 3 cycles to discharge node B to ground or to cause node B to discharge to a level below $V_{TH}$, as shown in waveform B of FIG. 4.

With E7 present, the voltage E8 at node B is at, or close to, zero volts (i.e. "Low"). When E8, which is one of the two inputs to "AND'ing" circuit 28, is low, P5 is turned-ON and N5 is turned-off. If E10 is also low, the output D of circuit 28 will be high. In the absence of a frequency responsive signal at node 7, node A charges up to approximately 1 volt and N4 turns off. When N4 turns off, the current produced by current sourcing transistor P3 charges up capacitor C2 whose potential rises towards $V_{DD}$ volts. When the potential at node B rises to more than $V_{TH}$ volts, transistor N5 turns on and transistor P5 turns off. The turn on of N5 causes the output (D) of circuit 28 to be clamped to ground and a shut off or disable signal to be applied to output buffer 30 of the repeater.

The amplitude threshold detector network 19 comprised of IGFETs P7, N7 and N8 provides the second input signal, E10, to "AND'ing" circuit 28. The conduction path of P7 is connected between $V_{DD}$ and an output node C at which is produced a DC signal level, E10. The gate electrode of P7 is returned to a point of bias potential VB1. In the circuit of FIG. 3, P7 is designed to produce a current of approximately 3 microamps when $V_{DD}$ is at 5 volts. The conduction paths of N7 and N8 are connected in series between node C and ground. The gate of N8 is connected to its drain and to the source of N7 whereby N8 functions as an offset diode connected between the source of N7 and ground. The gate electrode of N7 is returned to node 4 to which is applied the DC level (derived from network 16 and filter 18) indicative of the amplitude of the signals present at the input to the repeater.

When the signal E4 from the ALBO peak detector 16 and filter network 18 is more positive than two threshold voltages (i.e. 2 $V_{TH}$), where one threshold level represents the $V_{TH}$ of N8 and the other threshold level represents the $V_{TH}$ of N7, the output signal E10 of detector 19 is, or goes, to, or close to, one threshold voltage drop which is considered "LOW". When E4 is less than 2 $V_{TH}$, E10 is equal to, or close to, $V_{DD}$ volts, which is considered "HIGH".

When the E7 signal applied to terminal 7 is present, indicative that the signal applied to the repeater input is within the correct frequency range, the signal at node B is low. Therefore, when the frequency responsive signal is present at node 7, and the amplitude responsive signal is preset at node 4, signals B and C are low causing transistors P5 and P6 in "AND'ing" circuit 28 to be turned-on and transistors N5 and N6 to be turned-off whereby the output signal D is high. When the output signal D is high, the output buffer 30 of the repeater is enabled and the reshaped signals E9a and E9b are further amplified and recombined by the buffer and coupled via T2 to the cable for propagation along the line. The output buffer 30 amplifies, combines, reshapes and clips and E9 signals and produces signals E1' akin to E1 for propagation along the next section of telephone line.

When either one of B or C is high, indicating that either the amplitude of the signal being propagated is too low, or its frequency is incorrect, or both, either N5 or N6 is turned-on causing the output D to go low. When D goes low, the data signal on the telephone line is inhibited from being propagated along the telephone line.

What is claimed is:

1. A telephone cable repeater comprising:
    input means for receiving signals from one section of a telephone cable;
    amplitude and frequency responsive means, coupled to said input means, including:
    (a) a first means responsive to the amplitude of the signals received at said input means for producing a first signal having a first value when the amplitude of said received signals is above a preset level and having a second value when its amplitude is below said preset level; and
    (b) a second means responsive to the frequency of the signals received at said input means for producing a second signal having a first value when the frequency of said signals received at said input means is within a predetermined range and having a second value when the frequency of said signals received at said input means is outside said predetermined range;
    said amplitude and frequency responsive means also including means for producing an enabling signal when the amplitude of said signals is greater than said preset level and the frequency of said signals received at said input means is within said predetermined frequency range; and
    selectively enabled output means responsive to said enabling signal and to the signals received at said input means for producing regenerated signals for transmission to a subsequent section of telephone cable.

2. The combination as claimed in claim 1 wherein said means for producing an enabling signal includes a logical "AND'ing" means, coupled to said first and second means, responsive to said first and second signals for producing an enabling signal applied to said selectively enabled output means when said first signal is at its first value and said second signals is at its first value, and for producing a disablig signal applied to said selectively enabled output means when either one or both of said first and second signals is at its second value.

3. A repeater for a telephone cable comprising:
    input means for receiving signals from one section of said telephone cable;
    selectively enabled output means for producing regenerated signals for retransmission to another section of telephone cable;
    first means, coupled to said input means, responsive to the amplitude of said received signals for producing a first signal having a first value when the amplitude of the received signals is greater than a predetermined level and having a second value when the amplitude of the received signals is below said predetermined value;
    second means, coupled to said input means, responsive to the frequency of the signal received at said input means for producing a second signal having a first value when said received signals are within a predetermined frequency range and a second value when said received signals are outside said predetermined frequency range;

third means coupled between said input means and said output means responsive to said received signals for regenerating and reshaping said received signals; and control means, coupled between said first and second means and said output means, responsive to said first and second signals for producing a control signal enabling the propagation of said regenerated signals to said output means when said first signal has its first value and said second signal has its said first value and responsive to either one or both of said first and second signals having their said second value for inhibiting the propagation of said regenerated signals to said output means.

4. The combination as claimed in claim 3 wherein said first means includes an amplitude threshold detector;

wherein said second means includes a frequency to DC converter; and wherein said control means includes means for logically "AND'ing" said first and second signals and in response thereto producing said control signal.

* * * * *